United States Patent

[11] 3,574,369

| [72] | Inventor | John R. Andrew |
| | | Columbus, Ohio |
| [21] | Appl. No. | 813,901 |
| [22] | Filed | Apr. 7, 1969 |
| [45] | Patented | Apr. 13, 1971 |
| [73] | Assignee | The Columbus Auto Parts Company |
| | | Columbus, Ohio |

[54] BALL JOINT
4 Claims, 8 Drawing Figs.

[52] U.S. Cl. ................................................... 287/90,
29/149.5
[51] Int. Cl. ...................................................... F16c 11/06
[50] Field of Search .......................................... 287/90 (A),
90 (C), 87, 85 (A), 93 (Cursory); 29/149.5 (B),
441; 219/107

[56] References Cited
UNITED STATES PATENTS

| 1,606,894 | 11/1926 | Phelps | 219/107 |
| 1,665,468 | 4/1928 | Murray, Jr. | 219/107X |
| 2,871,315 | 1/1959 | Dales | 219/107X |
| 2,910,316 | 10/1959 | Dier | 287/90C |
| 3,199,902 | 8/1965 | Fierstine | 287/87 |
| 2,997,570 | 8/1961 | Thompson | 219/107 |
| 3,352,583 | 11/1967 | Patton | 287/93 |
| 3,464,723 | 9/1969 | Herbenar | 287/87 |

FOREIGN PATENTS

| 301,309 | 11/1954 | Switzerland | 287/90C |

*Primary Examiner*—David I. Williamowsky
*Assistant Examiner*—Andrew V. Kundrat
*Attorney*—Schmieding and Fultz

ABSTRACT: A flexible joint construction such as is used in automotive steering linkages or the like wherein upper and lower electrically conductive housing portions are fused together at a junction, uniform torque-transmitting and vibration-damping characteristics that are accurately maintained throughout the operational life of the flexible joint.

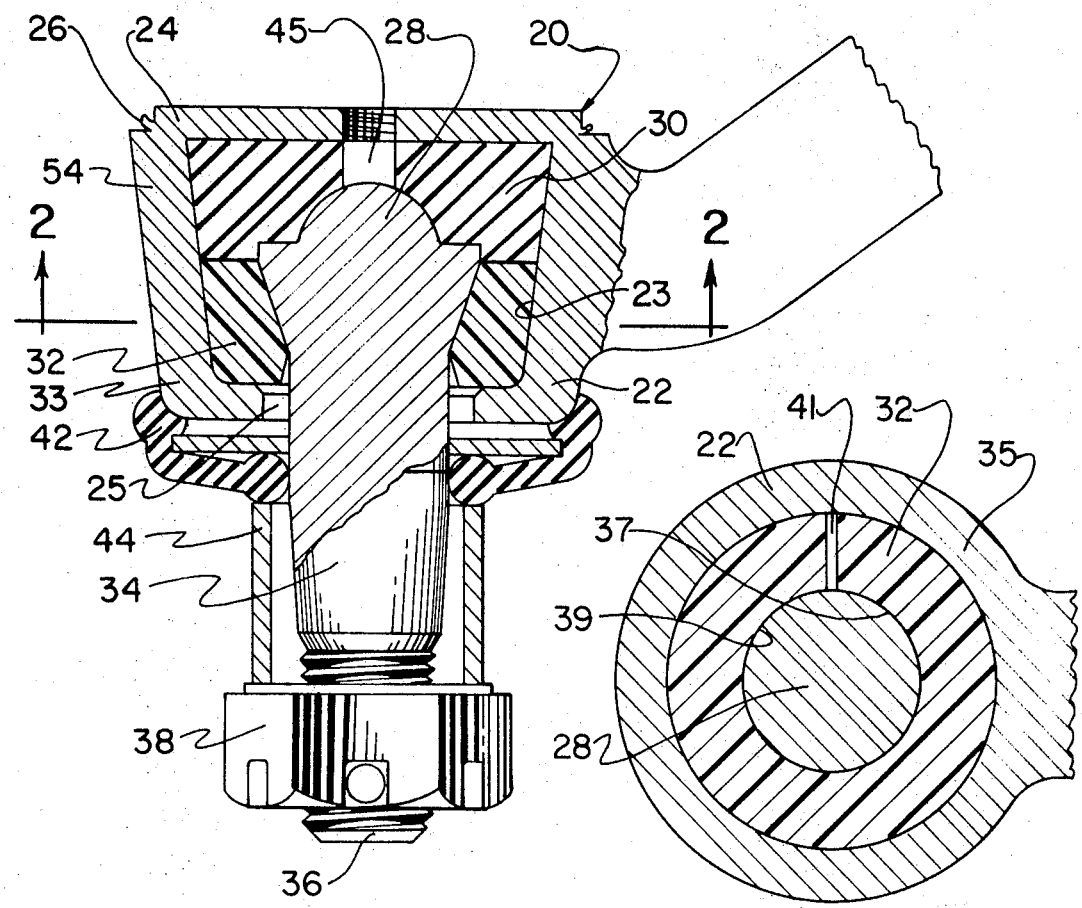

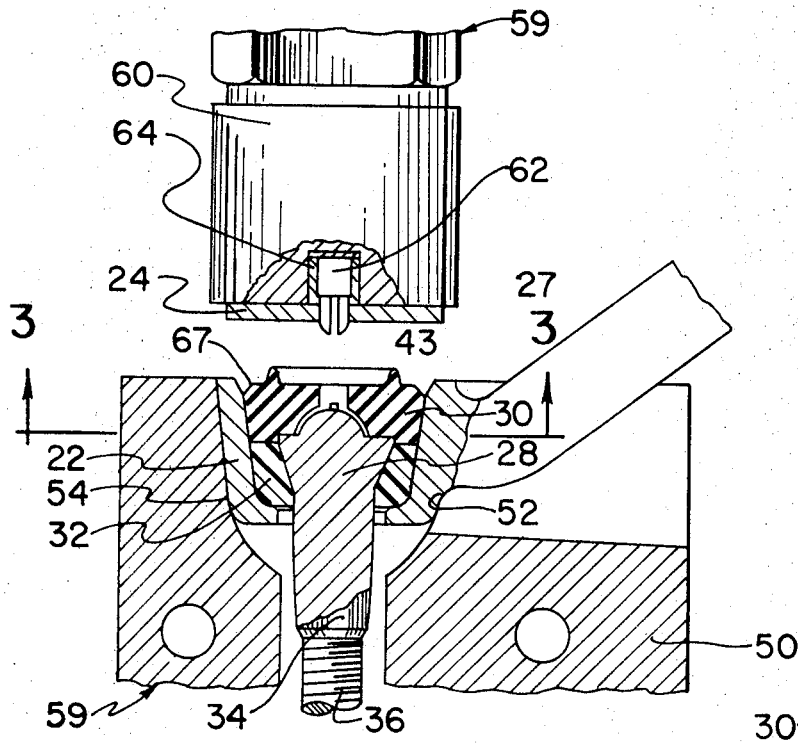
FIG. 4
FIG. 3
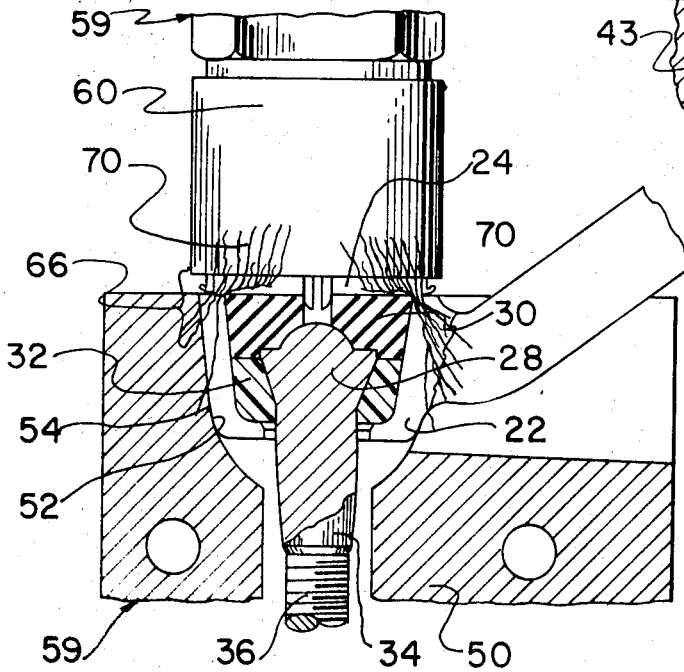
FIG. 5
INVENTOR.
JOHN R. ANDREW
BY
Schmieding & Sultz
ATTORNEYS

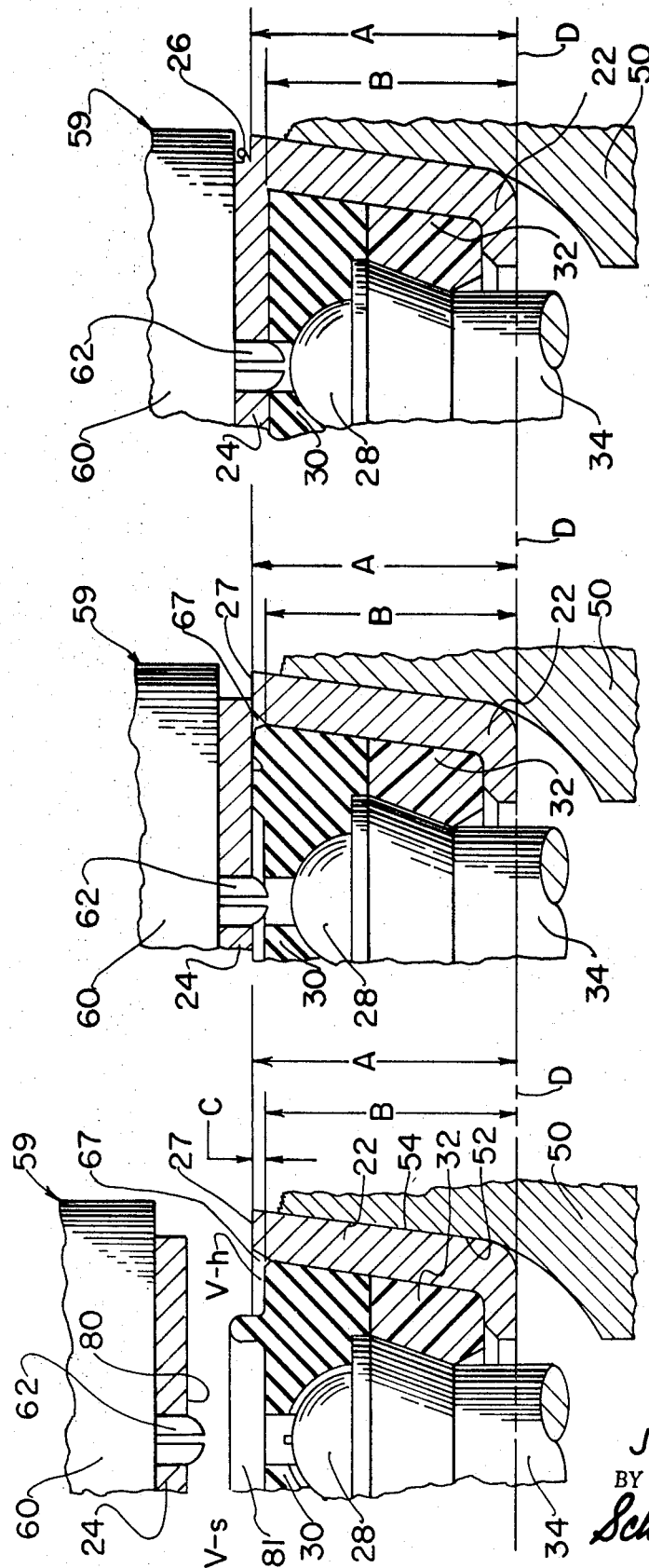

BALL JOINT

This invention relates generally to flexible joints and more particularly such devices of the type that are used in automobile-steering linkages or the like.

In general, the present invention consists of a novel flexible joint construction adapted to be precisely assembled at high rates of production with a deformable seat member within the joint preloaded in a precisely controlled manner so as to exert a predetermined force upon the pivotal head member of the joint and thereby achieve uniform torque-transmitting and vibration-damping characteristics that are maintained throughout the operational life of the joint.

More particularly, the present invention comprises, a pivotal ball or head member assembled between two seats in a cavity-forming housing portion that is closed with a closure-forming housing portion or cap. One of the seats is preferably formed of a synthetic polymer-bearing material such as nylon or the like. The other seat is preferably constructed of an elastomer such as urethane or equivalent shock and damping material. The two housing portion s are jointed in a novel controlled manner so as to compress the deformable seat and thereby effect the above-mentioned predetermined frictional force on the pivotal head member. It has been determined by laboratory tests and field studies of flexible joints of this type that when the preloading of the deformable seats is insufficient the joint will not effectively resist shock loads nor will they absorb road-imposed vibrations.

Moreover, hammering of the internal components of the joint will occur which results in excessive wear of the internal components and associated linkage.

On the other hand, if the cap or housing portion is too tightly assembled against the internal deformable seat then excessive swivel torque values, or actual binding of the internal components will occur.

It has further been determined that the maximum in fatigue life can be achieved, with the joint construction of the present invention, if the above-mentioned deformable seat portion is formed to a predetermined volume, and the cavity-forming housing portion is fabricated so as to include a predetermined internal volume. The two housing portions are joined in a novel controlled manner to deform the seat so as to cause it to fill substantially the volume of the cavity-forming housing portion.

In accordance with the present invention the two housing portions are secured together by first supporting a cavity-forming housing portion, with the internal joint components assembled therein, in a recess of a lower electrode of a resistance welding apparatus with the recess surface conforming in shape with and in electrically conductive contact with the exterior surface of such housing portion. The cap, or closure-forming housing portion is next supported on an upper electrode of said resistance welding apparatus so as to be in electrically conductive contact therewith.

The upper electrode that positions the cap is next actuated to cause the cap to engage the cavity-forming housing portion at an annular junction and the electrodes are then energized to heat said junction. At the same time the electrodes are used to apply pressure to the engaged housing portions and thereby cause the metal to upset at said annular junction, and the application of pressure is continued up to some predetermined electrode pressure value, to cause the cap to move down through an annular zone of local plasticity at said junction until the cap has compressed the deformable seat by a predetermined amount which will preload the seat against the pivotal head with a predetermined frictional force. Such predetermined force is preferably established such that the volume of the deformed seat substantially fills the internal volume of the housing. It has been determined that such predetermined electrode pressure can be accurately established and automatically controlled by the seating of controls for the resistance welding apparatus so as to achieve the above-mentioned predetermined force. This permits the filling of the internal housing volume with the deformable seat without the occurrence of excessive swivel torque values or actual locking of the internal parts of the joint.

As another aspect of the present invention, the housing means of the joint includes integrally fused housing portions joined at an annular zone of superior strength. This results in superior "cap pushout resistance" as compared to prior flexible joint constructions.

As another aspect of the present invention the novel flexible joint construction is characterized by a predetermined preloading of the deformable seat which results in substantial savings in labor and tooling as compared to conventional joint constructions. It should be mentioned that prior to the present invention it has been the practice to attach closure-forming housing portions by spinning, curling, or staking the upper edge of the cavity-forming housing portion so as to overlie the peripheral edge of said closure-forming housing portion. Such prior joining constructions required precise preassembly machining of the upper cap-receiving edge of the cavity-forming housing portion to establish precise concentricity. Such conventional operations have been very complex and expensive with respect to tool cost and maintenance.

In contrast, with the joint construction of the present invention the previously discussed predetermined frictional force can be accurately established and maintained.

It is therefore an object of the present invention to provide a new and improved flexible joint construction which is characterized by precisely controlled preloaded internal seats, and resulting accurately established swivel torque values.

It is another object of the present invention to provide a joint construction of the type described wherein hammering of the internal components during operational use is prevented, with a resulting increase in fatigue life.

It is another object of the present invention to provide improved flexible joints wherein the occurrence of excessive swivel torque values can be eliminated.

It is another object of the present invention to provide an improved flexible joint construction wherein a closure-forming housing portion is integrally fused to a cavity-forming housing portion at an annular junction of superior strength. As a result the resistance to internal "pushout" forces, imposed by the internal pivotal head on the housing, is substantially increased.

It is another object of the present invention to provide an improved flexible joint construction which can be fabricated with reduced machining costs as compared to prior joint constructions.

Further objects and advantages of the present invention will be apparent from the following description, reference being had to the accompanying drawings wherein a preferred form of the embodiment of the invention is clearly shown.

In the drawings:

FIG. 1 is a partial side sectional view of a pivot joint constructed in accordance with the present invention, the section being taken along a vertical plane through the centerline of the device;

FIG. 2 is a transverse cross-sectional view taken along the line 2–2 of FIG. 1;

FIG. 3 is a transverse cross-sectional view taken along the line 3–3 of FIG. 4;

FIG. 4 is a partial side sectional view showing the housing portions of the pivot joint of FIG. 1 positioned on upper and lower positioning electrodes, the section being taken along a vertical plane through the centerline of the device;

FIG. 5 is a partial side section view corresponding to FIG. 2 and showing the electrodes in an energized position; and FIGS. 6 through 8 are partial side section views illustrating steps in the fabrication of the flexible joint construction of the present invention, the sections being taken along a vertical plane through the centerline of positioning electrodes with pivot joint components supported thereon.

Referring in detail to the drawings, a pivot joint constructed in accordance with the present invention is illustrated in FIG. 1 and comprises housing means indicated generally at 20 formed from a lower or recess-forming housing portion 22 and an upper or closure-forming housing portion 24 which are integrally fused at a junction 26.

The pivot joint of FIG. 1 further includes a pivotal head 28, an upper seat 30, and a lower seat 32, said seats serving to frictionally engage said head.

Lower seat 32 is preferably constructed of a synthetic resinous bearing material such as the material distributed under the name of Delrin, although any other suitable abrasive resistant, low-friction material such as nylon or the like may be used satisfactorily. Seat member 32 is supported at its lower end upon the annular shoulder 33 and is formed with a frustoconical external surface 35 which engages the inner surface 23 of lower housing 22. Seat 32 further includes an internal frustoconical surface 37 that conforms with and frictionally engages the lower outer surface 39 of pivotal head 28.

As seen in FIG. 2, a lot 41 in seat 32 permits the seat to adjust to any slight dimensional irregularities in the size of the cavity in lower housing portion 22.

With reference to FIGS. 1, 3, and 4, upper seat 30 is preferably formed of a synthetic rubber material such as urethane or equivalent shock- and vibration-absorbing material. A durometer rating of approximately 50 Shore D has been found to be quite satisfactory.

The upper seat 30, FIGS. 3 and 4, can be provided with a central hole 45 and radially extending grooves 43 for the distribution of lubricant to the engaging frictional surfaces.

Head 28 includes a shank portion 34 provided with a threaded lower end 36 and a nut 38 for attaching the pivotal head 28 to adjacent structure in operational use.

Referring again to FIG. 1 the lower portion of the flexible joint between the lower seat 32 and pivotal head 28 is sealed by a dust cover 42 formed of an elastomer such as Neoprene or the like. A cylindrical ferrule 44 is mounted between dust cover 42 and nut 38.

Reference is next made to FIGS. 4 and 5 which illustrate assembly of the pivot joint of FIG. 1 wherein it will be seen that the components of such joint are assembled by application of resistance heating and pressure to upset and fuse the housing portions in a controlled manner.

In preparing the recess-forming housing portions 22 for assembly the sequence of operations is as follows:

1. Forge to shape
2. Coin to finish inner surface 23
3. Pierce bottom opening 25
4. Face off top surface 27 to establish a predetermined dimension A greater than the desired finished dimension B as shown in FIG. 6.
5. Mill bottom opening 25 to establish proper angularity for required range of motion of shank 34
6. Assemble internal components in recess-forming housing portion 22
7. Apply heat and pressure in a controlled manner to upset and fuse housing portions.

In preparing lower housing portions such as 22 for assembly of conventional flexible joints the sequence of operations is generally as follows:

1. Forge to shape
2. Coin to finish inner surface 23
3. Pierce bottom opening 25
4. Turn, counterbore and face to prepare a recess, not illustrated, for receiving a closure-forming housing portion
5. Mill bottom opening 25 to establish proper angularity for required range of motion of shank 34
6. Assemble internal components in recess-forming housing portion 22
7. Attach upper housing portion by spinning, curling, or staking the upper edge of the lower housing portion so as to overlie the peripheral edge of the upper housing portion and thereby retain same.

It will now be seen that the differences in the two fabrication procedures occur in steps 4 and 7. It should be pointed out that step 4 of the conventional technique is quite expensive with respect to both labor and tooling since accurate concentricity must be maintained between the turn and counterbore operations, as well as with the body of the socket. It should be emphasized that the tools to perform these conventional operations are very complex and expensive.

In contrast, in fabricating flexible joints of the present invention, it is merely necessary to face off the top surface 27 of the lower housing portion to establish a predetermined dimension A above a reference datum D so far as the preparation step 4 is concerned.

FIG. 4 illustrates a portion of an apparatus 59 which includes a lower electrode 50 for positioning lower housing portion 22 with an inner surface 52 of said electrode conforming in shape with an outer surface 54 of said lower housing portion.

The apparatus 59 for closing flexible joint 20 further includes a movable upper electrode 60 which serves to position the previously mentioned closure-forming housing portion 24, as well as means for applying pressure to the housing portions.

As seen in FIG. 4 upper electrode 60 includes a split pin 62 which is insulated from electrode 60 by a layer of insulation 64.

The above-mentioned lower electrode 50 and upper electrode 60 are energized and pressurized by an electric resistance projection welding machine, of a press type, which may be air operated and provided with automatic voltage control. With a machine of this type, and with the electrodes constructed in accordance with the present application, the heating, application of pressure, and upsetting of metal are concentrated in a precisely controlled manner in a localized zone in the housing portions at their junction.

Reference is next made to FIG. 5 which illustrates the same upper electrode 60, and lower electrode 50 in a pressure-applying configuration wherein the upper housing portion or cap 24 has been brought into engagement with a peripheral upper edge of lower housing portion 22.

In this configuration of FIG. 5 the upper and lower electrodes 60 and 50 have been energized to upset metal and fuse the junction of a peripheral edge of cap 24 and an upper edge of lower housing portion 22.

It is important to note that electrical energy is concentrated at an annular zone at said junction as is indicated by the diagrammatic lines representing current flow as seen at 70 in FIG. 5.

Reference is next made to FIGS. 6, 7, and 8 which diagrammatically illustrate, in more precise detail, the fabrication of flexible joints of the present invention.

FIG. 6 illustrates the previously mentioned lower positioning electrode 50 and an upper positioning electrode 60, with said electrodes serving to respectively position lower cavity-forming housing portion 22 and upper closure-forming housing portion 24. Here it should be mentioned that lower cavity-positioning electrode 50 includes inner surface 52 which substantially conforms in shape with outer surface 54 of said lower housing portion. Such surface conformation makes the metal of the lower housing portion 22 and the electrode 50 in such intimate conductive contact that the electrical energy transmitted to junction 66 can be most efficiently applied to the upsetting and fusing of such junction.

FIG. 7 illustrates another step in fabricating the flexible joint of the present invention wherein the upper electrode 60 has been moved downwardly so as to bring upper housing portion 20 into engagement with lower housing portion 11. It will be noted, FIG. 7, that an undersurface 80 of upper housing portion 24 has started to compress an annular protrusion 81 on the top of upper seat 30 and thereby deform the resilient material so as to cause it to start to flow within the volume N−h in lower housing portion 22. At this point the previously mentioned upsetting and fusing apparatus 59 is energized to thereby concentrate its heating effect at the annular junction 66 between the two housing portions. At the same time pressure is applied to the joint by the apparatus such that upper electrode 60 moves upper housing portion 24 downwardly for a dimension equal to a predetermined dimension C whereby lower surface 80 on the upper housing portion is moved downwardly to a terminal dimension B as will be best seen in FIGS. 7 and 8.

It is important to note that after such downward movement of the lower surface 80 of upper housing portion 24 the ultimate dimension B represents a predetermined dimension with respect to a reference datum D at which the deformed upper resilient seat 30 exerts a predetermined preload force on pivotal head 28 whereby the frictional resistance imposed by the seat surfaces on the head surfaces provides the desired predetermined swivel torque value for the pivot joint.

In the preferred embodiment the predetermined ultimate dimension B, and the volumes N–$s$ and N–$h$ are so established as to cause the deformed volume V–$s$ of upper seat 30 to just completely fill the upper portion of the volume V–$h$ of the lower housing portion as seen in FIGS. 1, 5, and 8.

At the time that electrode 60 arrives at its terminal position of FIG. 8, wherein the lower surface 80 of the closure-forming housing portion 24 is located at predetermined dimension B from the reference datum B, the electrical energy previously discussed is terminated whereby the upset junction 66, FIGS. 5 and 8, will solidify thereby locking closure-forming housing portion 24 in the position shown in FIGS. 1 and 8. In this position upper seat 30 is deformed to provide the above-described predetermined preload by the application of electrical energy and the predetermined electrode pressure to the annular zone at junction 66 in FIG. 5.

It should be pointed out that the upper peripheral edge of upper seat 30 and the upper inner edge of lower housing portion are beveled so as to form an annular insulating space 67, as seen in FIGS. 4, 6, and 7. Such space 67 serves to minimize the transfer of heat from the annular junction 66 at the time of upsetting and fusing of the junction. This prevents excessive heating and possible damage to the resilient seat material.

It will now be understood that by the controlled application of heat and pressure and by using an apparatus 59 which is pressure controlled automatically, it is possible to sequentially assemble pivot joints at high production rates such that the preloaded frictional force exerted by the seats, and the resulting swivel torque values accurately fall within acceptable limits.

I claim:

1. A flexible joint comprising, in combination, first and second housing portions defining a cavity, said second housing portion engaging said first housing portion at a junction, seat means positioned in said cavity, a head member pivotally supported by said seat means, said seat means including a resilient seat portion extended toward said second housing portions and a recessed seat portion, said housing portions being upset and fused at said junction under predetermined pressure so as to decrease the original stacked dimension thereof and compress said resilient seat portion toward said recessed seat portion whereby said seat means is biased into engagement with said head member by said compressed seat portion so as to exert a predetermined frictional force on said head member, said cavity in said housing portion forming a predetermined volume, wherein said seats are of a predetermined volume, and wherein said deformable resilient seat material is compressed to substantially fill said predetermined volume.

2. A flexible joint comprising, in combination, a cavity-forming housing portion including a cavity and an opening defined by an annular edge; a closure-forming housing portion including a peripheral edge; a first seat formed of synthetic resinous material; a second seat formed of deformable resilient material such as synthetic rubber or the like; and a head member pivotally supported by said seats; said housing portions being upset and integrally fused at said edges under predetermined pressure to deform certain of said edges toward said cavity and compress said second seat whereby said seats are biased into engagement with said head member by said compressed resilient material so as to exert a predetermined force on said head member.

3. A flexible joint comprising, in combination, first and second housing portions engaging one another at a junction, a first seat-engaging surface on said first housing portion, a second seat-engaging surface on said second housing portion, a first seat formed of synthetic resinous material and engaged by said first surface, a second seat formed of elastomeric material and engaged by said second surface, said housing portions being upset and fused at said junction under predetermined pressure whereby said deformable elastomeric material is compressed so as to decrease a dimension A between said seat-engaging surfaces by an amount substantially equal to a dimension C whereby the space between said surfaces is established at a dimension substantially equal to B.

4. A flexible joint comprising, in combination, a first housing portion including a predetermined internal volume V–$h$ and an upper edge surface located a predetermined dimension A above a reference datum D; a second housing portion including an internal seat-engaging surface and a peripheral edge; a first internal seat formed of synthetic resinous material; a pivotal head; a second internal seat formed of elastomeric material to a predetermined volume V–$s$, said first seat, head, and second seat being positioned in stacked relation in said housing portions; said edges being upset and fused under predetermined pressure with the vertical dimension between said internal seat-engaging surface and a reference datum D being substantially equal to a predetermined dimension B at which position the volume V–$s$ of the deformed elastomeric seat substantially fills the upper portion of the volume V–$h$ of the first housing portion.